US012626964B2

(12) United States Patent
Boggs et al.

(10) Patent No.: US 12,626,964 B2
(45) Date of Patent: May 12, 2026

(54) THERMAL WAKEUP FOR BATTERY MANAGEMENT SYSTEM CONTROLLER

(71) Applicant: Caterpillar Inc., Peoria, IL (US)

(72) Inventors: Matthew Lee Boggs, Metamora, IL (US); Jason Lee Miller, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 471 days.

(21) Appl. No.: 17/723,841

(22) Filed: Apr. 19, 2022

(65) Prior Publication Data

US 2023/0335814 A1    Oct. 19, 2023

(51) Int. Cl.
| | |
|---|---|
| *H01M 10/48* | (2006.01) |
| *H01M 10/613* | (2014.01) |
| *H01M 10/615* | (2014.01) |
| *H01M 10/625* | (2014.01) |
| *H01M 10/63* | (2014.01) |

(52) U.S. Cl.
CPC ....... *H01M 10/486* (2013.01); *H01M 10/482* (2013.01); *H01M 10/613* (2015.04); *H01M 10/615* (2015.04); *H01M 10/625* (2015.04); *H01M 10/63* (2015.04)

(58) Field of Classification Search
CPC ............. H01M 10/486; H01M 10/613; H01M 10/615; H01M 10/625; H01M 10/63; H01M 10/482
See application file for complete search history.

(56) References Cited

U.S. PATENT DOCUMENTS

| | | | |
|---|---|---|---|
| 2011/0130983 A1 | 6/2011 | Yang et al. | |
| 2014/0312848 A1* | 10/2014 | Alexander | ........ H02J 7/007192 |
| | | | 320/134 |
| 2018/0212280 A1* | 7/2018 | Zacher | ................ H01M 10/425 |
| 2019/0120908 A1 | 4/2019 | Naha et al. | |
| 2019/0296575 A1 | 9/2019 | Yang | |

FOREIGN PATENT DOCUMENTS

| | | | | |
|---|---|---|---|---|
| CN | 101318489 | | 9/2011 | |
| CN | 110212216 A | * | 9/2019 | |
| CN | 211844152 | | 11/2020 | |
| CN | 112421749 A | * | 2/2021 | ............... G05F 1/67 |

(Continued)

OTHER PUBLICATIONS

CN 110212216 English Translation (Year: 2019).*

(Continued)

*Primary Examiner* — Jimmy Vo
(74) *Attorney, Agent, or Firm* — Schwegman Lundberg & Woessner, P.A.

(57) ABSTRACT

A monitoring circuit for a battery system of a work machine includes a system controller configured to operate in a low power mode when the battery system is inactive, a sensing circuit element configured to produce an electrical sensor signal representative of an environmental parameter of the battery system, and a wakeup circuit configured to generate a controller activation signal when the sensor signal indicates that the environmental parameter is outside of a specified operating range. The system controller is configured to initiate a controller boot operation in response to the controller activation signal.

9 Claims, 6 Drawing Sheets

100

(56)               References Cited

FOREIGN PATENT DOCUMENTS

| CN | 212458442 | 2/2021 |
|----|-----------|--------|
| CN | 112677747 | 4/2021 |

OTHER PUBLICATIONS

CN 112421749 English Translation (Year: 2021).*
JP 3990003 English Translation (Year: 2007).*
CN 106876653 English Translation (Year: 2017).*
CN 103915657 English Translation (Year: 2017).*
KR 20030065380 English Translation (Year: 2003).*

\* cited by examiner

500

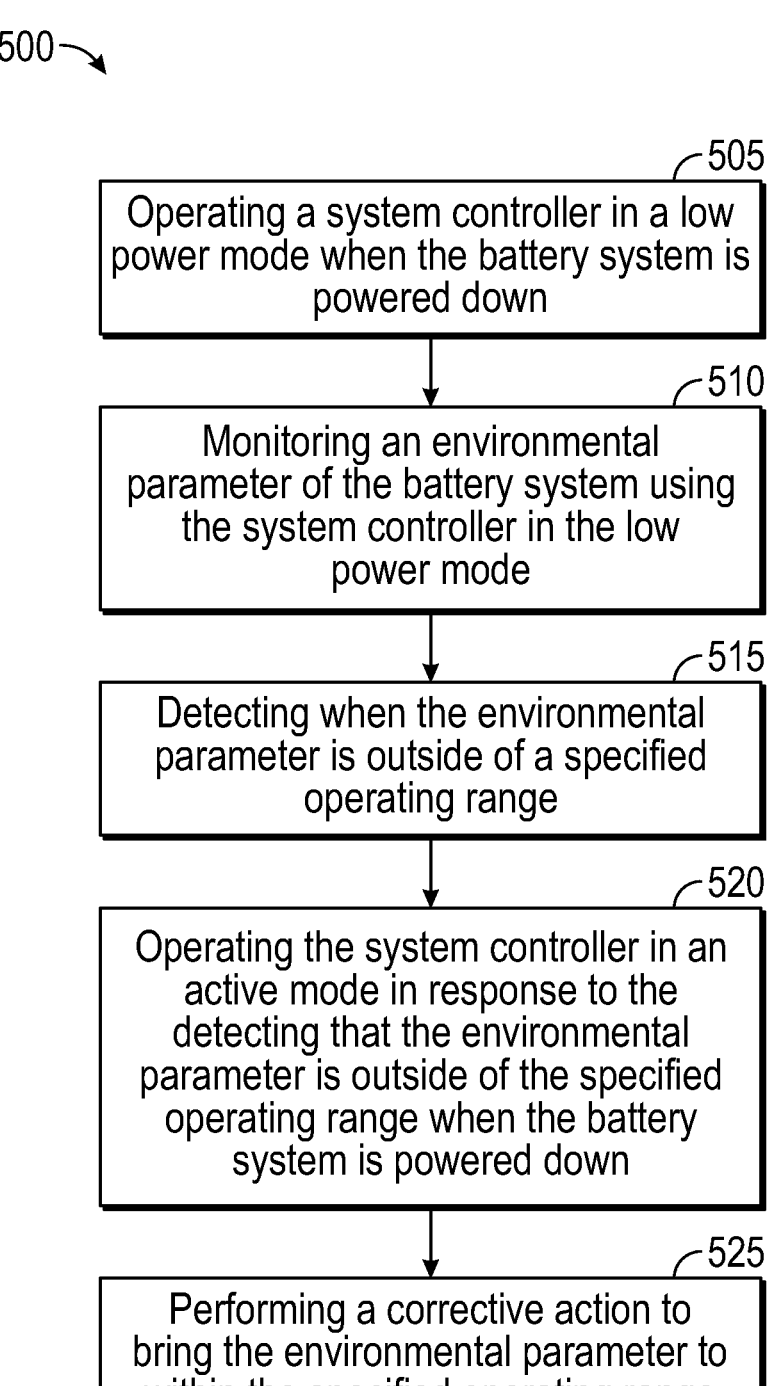

505

Operating a system controller in a low power mode when the battery system is powered down

510

Monitoring an environmental parameter of the battery system using the system controller in the low power mode

515

Detecting when the environmental parameter is outside of a specified operating range

520

Operating the system controller in an active mode in response to the detecting that the environmental parameter is outside of the specified operating range when the battery system is powered down

525

Performing a corrective action to bring the environmental parameter to within the specified operating range

FIG. 5

THERMAL WAKEUP FOR BATTERY MANAGEMENT SYSTEM CONTROLLER

TECHNICAL FIELD

This document relates to electric powered work machines and in particular to techniques of managing the battery systems of electric powered work machines.

BACKGROUND

Powering a large moving work machine (e.g., a wheel loader) with an electric motor requires a large mobile electric energy source that can provide current of hundreds of Amperes (Amps). This large mobile energy source can include multiple large capacity battery cells connected in parallel as battery strings that provide the sustained energy power needed by a large electric-powered moving work machine. It may be desirable to ensure that the performance or the lifetime of the large capacity battery cells aren't compromised by environmental conditions.

SUMMARY OF THE INVENTION

Electric powered large moving work machines use large capacity battery systems that may remain idle for periods of time when the work machine is not in use. It would be useful to avoid environmental conditions that can impact the performance and lifetime of the batteries, but monitoring the status of the battery system shouldn't impact battery life through extra energy drain.

An example monitoring circuit for a battery system of a work machine includes a system controller configured to operate in a low power mode when the battery system is inactive, a sensing circuit element configured to produce an electrical sensor signal representative of an environmental parameter of the battery system, and a wakeup circuit configured to generate a controller activation signal when the sensor signal indicates that the environmental parameter is outside of a specified operating range. The system controller is configured to initiate a controller boot operation in response to the controller activation signal.

An example method of monitoring a battery system of a work machine includes operating a system controller in a low power mode when the battery system is powered down, monitoring an environmental parameter of the battery system using the system controller in the low power mode, detecting when the environmental parameter is outside of a specified operating range, operating the system controller in an active mode in response to the detecting that the environmental parameter is outside of the specified operating range when the battery system is powered down, and the system controller initiating a corrective action to bring the environmental parameter to within the specified operating range.

An example battery system of a work machine includes at least one battery pack including multiple battery cells; a system controller, and a monitoring circuit. The monitoring circuit includes a sensing circuit element configured to produce an electrical sensor signal representative of temperature of the battery cells, and a comparator circuit configured to generate a controller activation signal when the sensor signal indicates that the temperature of the battery cells is outside of a specified operating range. The system controller is configured to initiate a corrective action in response to the controller activation signal.

BRIEF DESCRIPTION OF THE DRAWINGS

FIG. 5 is a flow diagram of an example method of real time monitoring of the environment conditions of a battery system of a work machine in accordance with this disclosure.

DETAILED DESCRIPTION

Examples according to this disclosure are directed to methods and systems for automatic monitoring a battery system of a work machine. Monitoring the environmental conditions of the battery system allows for predictive maintenance to avoid negative impact on the performance of the battery system.

Figure 1:
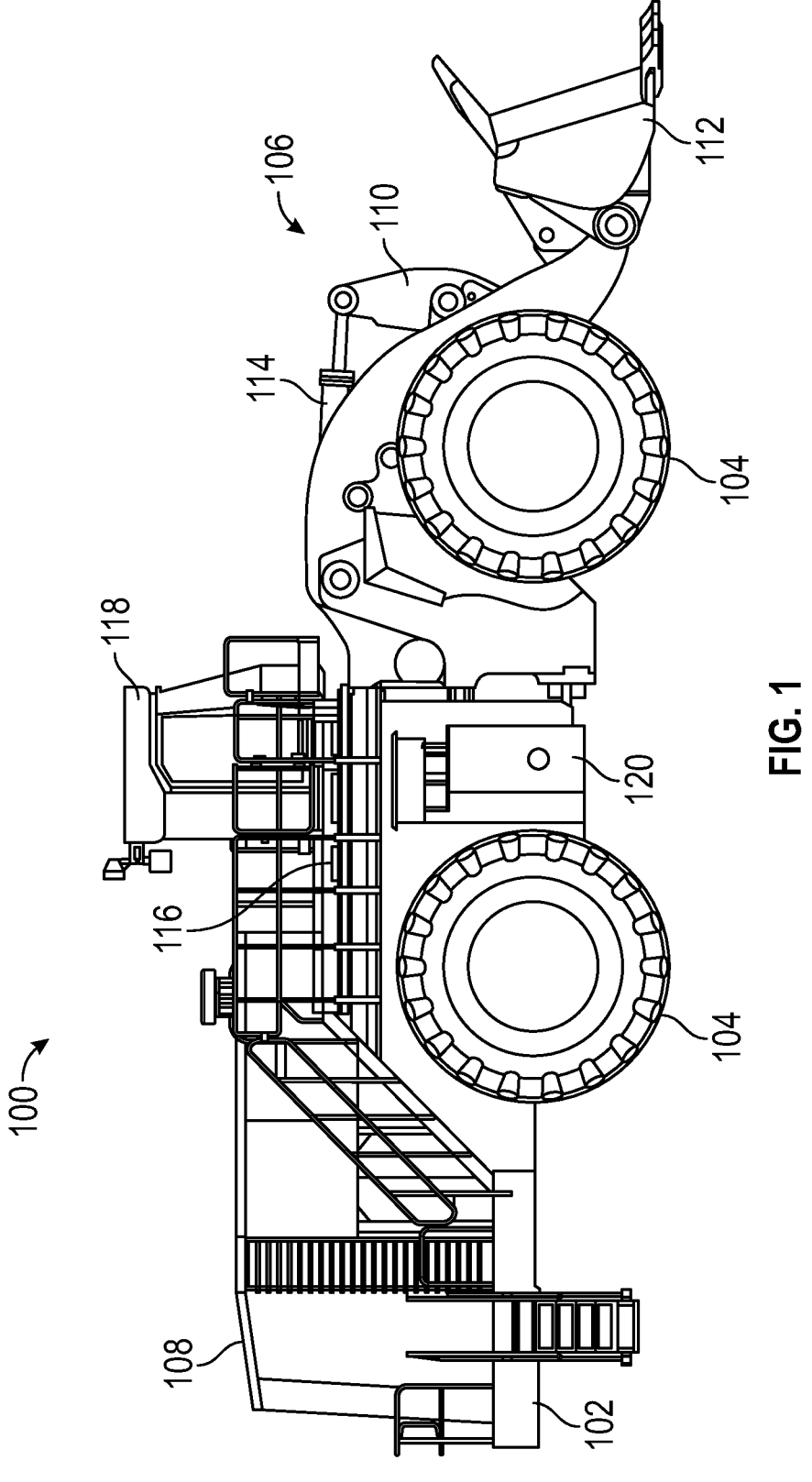
FIG. 1 is an elevation view depicting an example work machine in accordance with this disclosure.

FIG. 1 depicts an example machine 100 in accordance with this disclosure. In FIG. 1, machine 100 includes frame 102, wheels 104, implement 106, and a speed control system implemented in one or more on-board electronic devices like, for example, an electronic control unit or ECU. Example machine 100 is a wheel loader. In other examples, however, the machine may be other types of machines related to various industries, including, as examples, construction, agriculture, forestry, transportation, material handling, waste management, and so on. Accordingly, although a number of examples are described with reference to a wheel loader machine, examples according to this disclosure are also applicable to other types of machines including graders, scrapers, dozers, excavators, compactors, material haulers like dump trucks, along with other example machine types.

Machine 100 includes frame 102 mounted on four wheels 104, although, in other examples, the machine could have more than four wheels. Frame 102 is configured to support and/or mount one or more components of machine 100. For example, machine 100 includes enclosure 108 coupled to frame 102. Enclosure 108 can house, among other components, an electric motor to propel the machine over various terrain via wheels 104. In some examples, multiple electric motors are included in multiple enclosures at multiple locations of the machine 100.

Machine 100 includes implement 106 coupled to the frame 102 through linkage assembly 110, which is configured to be actuated to articulate bucket 112 of implement 106. Bucket 112 of implement 106 may be configured to transfer material such as, soil or debris, from one location to another. Linkage assembly 110 can include one or more cylinders 114 configured to be actuated hydraulically or pneumatically, for example, to articulate bucket 112. For example, linkage assembly 110 can be actuated by cylinders 114 to raise and lower and/or rotate bucket 112 relative to frame 102 of machine 100.

Platform 116 is coupled to frame 102 and provides access to various locations on machine 100 for operational and/or maintenance purposes. Machine 100 also includes an operator cabin 118, which can be open or enclosed and may be accessed via platform 114. Operator cabin 118 may include one or more control devices (not shown) such as, a joystick, a steering wheel, pedals, levers, buttons, switches, among other examples. The control devices are configured to enable the operator to control machine 100 and/or the implement 106. Operator cabin 118 may also include an operator interface such as, a display device, a sound source, a light source, or a combination thereof.

Machine 100 can be used in a variety of industrial, construction, commercial or other applications. Machine 100 can be operated by an operator in operator cabin 118. The operator can, for example, drive machine 100 to and from various locations on a work site and can also pick up and deposit loads of material using bucket 112 of implement 106. As an example, machine 100 can be used to excavate a portion of a work site by actuating cylinders 114 to articulate bucket 112 via linkage 110 to dig into and remove dirt, rock, sand, etc. from a portion of the work site and deposit this load in another location. Machine 100 can include a battery compartment connected to frame 102 and including a battery system 120. Battery system 120 is electrically coupled to the one or more electric motors of the machine 100.

Figure 2:
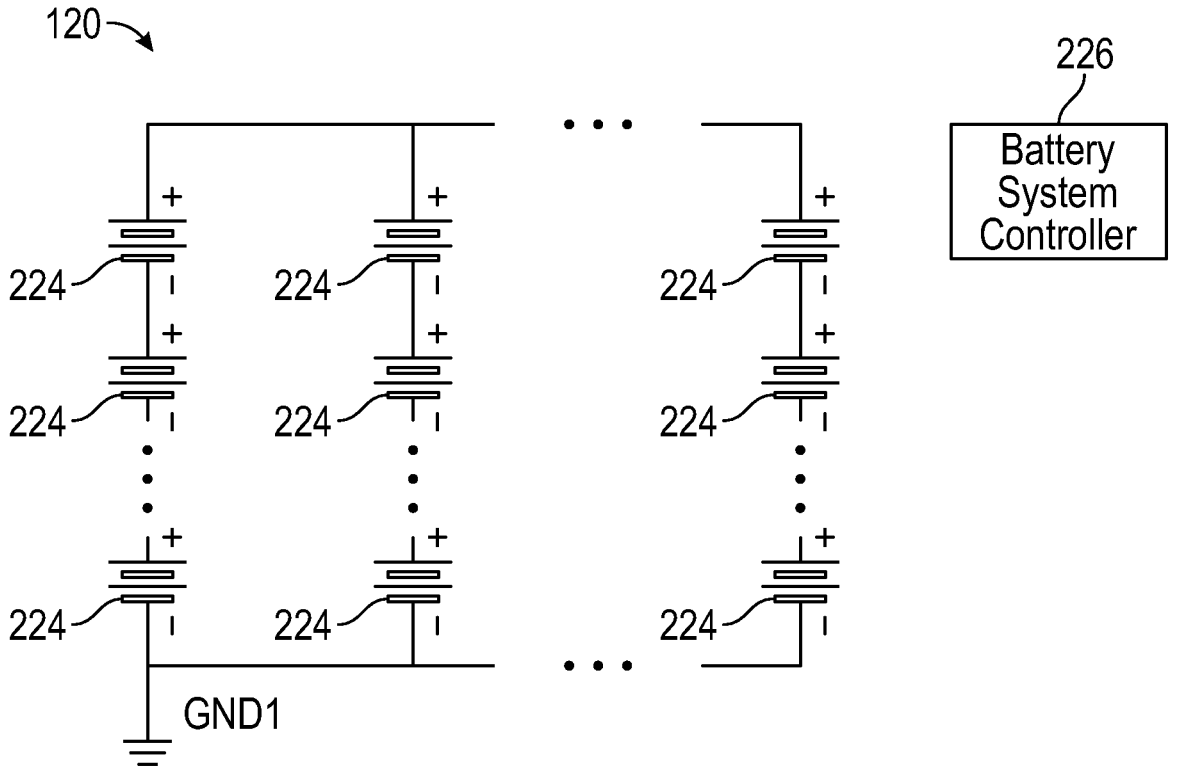
FIG. 2 is a block diagram of a battery system for a work machine in accordance with this disclosure.

FIG. 2 is a block diagram of a battery system 120. The battery system 120 can be included in a mobile energy source used to provide power to an electric motor of a work machine, such as the example machine 100 of FIG. 1. The battery system 120 includes multiple battery cells 224 (e.g., two to eight battery cells) connected in parallel. The battery cells 224 are large capacity battery cells (e.g., a 750 Volt, 80 Amp-hour battery, or 60 kilowatt-hours). The battery cells 224 may be included in one battery pack or multiple battery packs connected in parallel in the battery system 120. The battery system 120 also includes a system controller 226. The system controller 226 includes circuitry to perform tasks such as bringing the battery cells online and to monitor the condition of the battery cells 224.

Figure 3:
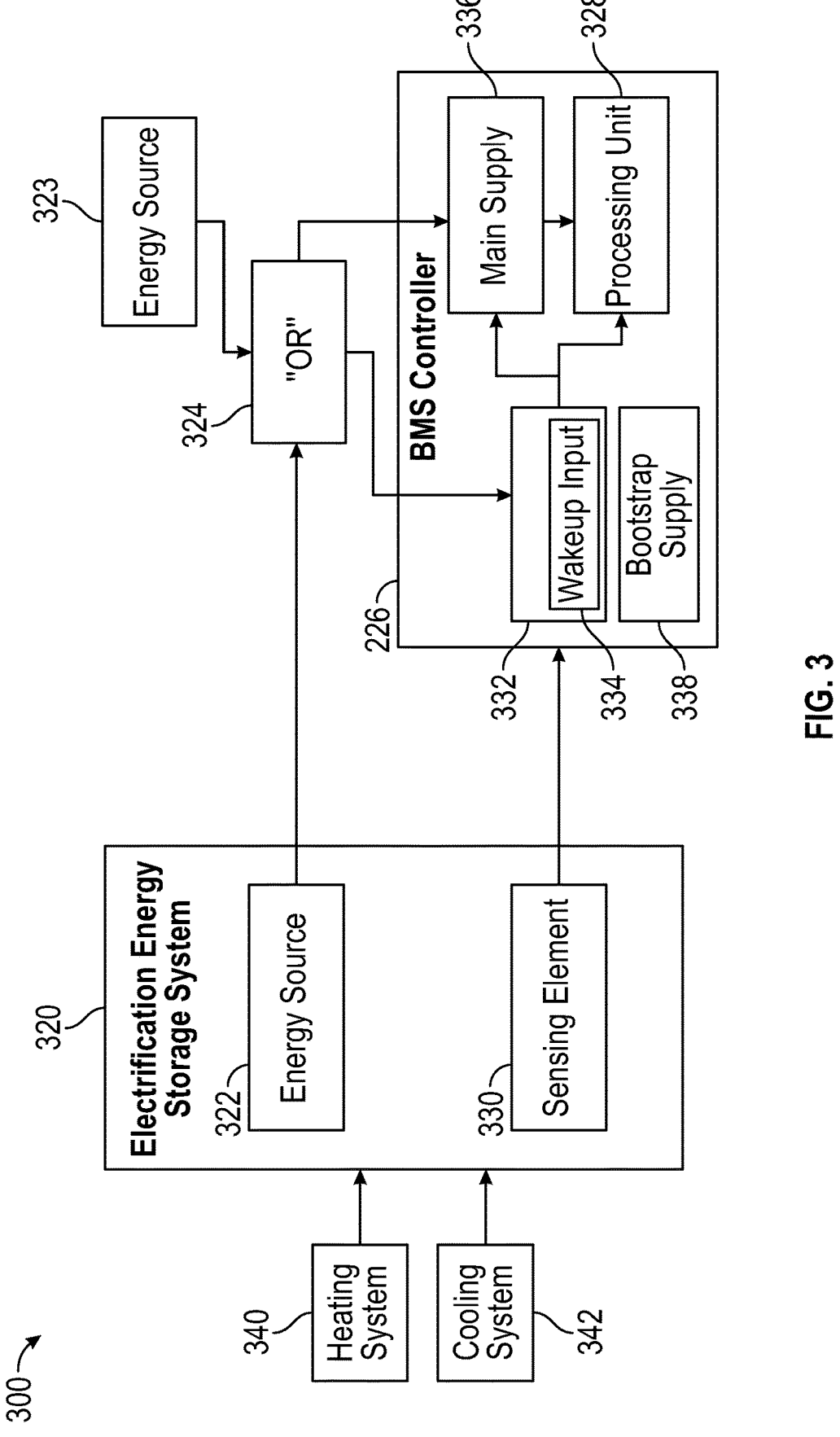
FIG. 3 is a block diagram of portions of an example of an energy source for a work machine in accordance with this disclosure.

FIG. 3 is a block diagram of portions of an example of an energy system 300 for a work machine. The energy system 300 includes an energy storage system 320 (e.g., the battery system of FIG. 2) that can include an energy source 322 such as one or more battery packs that each include one or more battery cells. The energy system can include a second separate energy source 323 independent of the energy storage system 320. The energy system 300 also includes a system controller 226 to manage the energy storage system. The "OR" block 324 in FIG. 3 represents that system controller 226 could be powered using the energy storage system 320 it is managing or the system controller 226 can be powered using a separate energy source 323 to power the system controller 226. The separate energy source 323 is independent of the energy storage system 320, and may have a different voltage potential than the energy storage system 320.

When the system controller 226 is in an active mode, the system controller 226 brings the energy storage system 320 online to provide electrical power to the work machine and monitors operation of the energy storage system 320, such as to identify faults, change a configuration of the cells of the energy storage system 320, and the like.

When the energy storage system 320 is not being utilized, it is desired to not have the system controller 226 continuously operating in order to reduce the energy drain by an idle energy system. However, it is still desired to monitor the physical characteristics of the energy storage system 320. For example, it may desired to monitor the ambient air temperature or the temperature of individual components of the energy storage system to avoid excessively high or low temperatures that can impact the energy storage system 320.

The system controller 226 may include processing circuitry (e.g., processing unit 328) that includes logic to perform the functions described. The processing circuitry may include a microprocessor, application specific integrated circuit (ASIC), field programmable gate array (FPGA), or other type of processor, interpreting or executing instructions in software or firmware stored in memory. The energy storage system 320 includes one or more sensing circuit elements 330 to provide an electrical sensor signal representative of one or more physical characteristics of one or more components of the energy storage system 320.

To monitor the energy storage system 320, the system controller 226 is placed in a low power mode. In lower power mode, the number of circuits of the system controller 226 that are active is reduced. For example, the processing circuitry may be powered down or set to an idle mode in which functionality of the system controller 226 is reduced. In the low power mode, enough circuitry remains active in system controller 226 to monitor one or more physical characteristics of the energy storage system 320.

For instance, the system controller 226 includes an interface 332 to the sensing circuit element 330. This interface 332 may remain active while other circuitry of the system controller 226 is in low power mode and is inactive. In some examples, the interface 332 includes a wakeup circuit 334. The wakeup circuit 334 is active in the low power mode and includes logic that generates a controller activation signal when the sensor signal indicates that the environmental parameter is outside of a specified operating range. The system controller 226 becomes active in response to the controller activation signal.

The system controller 226 includes a main supply circuit 336 and a bootstrap supply circuit 338. The main supply circuit 336 provides power to the system controller 226 in normal operation. In low power mode, the main supply circuit 336 may be powered down or disconnected from some or all of the circuitry (e.g., the processing unit 328) of the system controller 226. The bootstrap supply circuit 338 may provide the power to the circuits (e.g., the wakeup circuit 334) that remain active in the low power mode. The controller activation signal enables the main supply circuit 336 activating the processing unit 328. Upon activation, the processing unit 328 may initiate a controller boot operation.

In response to activation, the system controller 226 may initiate a corrective action to bring the environmental parameter to within the specified operating range. In some examples, the sensing circuit element 330 is a temperature sensing circuit element that produces a sensor signal representative of temperature of one or more components (e.g., one or more battery cells) of the energy storage system 320. The wakeup circuit 334 generates the activation signal when the sensing circuit element 330 indicates a temperature that is outside of a specified temperature range (i.e., the environmental temperature of the energy storage system is too hot or too cold for ideal operation or to preserve lifetime of the battery cells).

In response to the activation signal, the system controller 226 may determine the temperature status using the sensor signal (e.g., by determining a voltage level of the sensor signal) to determine whether the temperature is above the specified temperature range or below the specified temperature range. If the sensor signal indicates the temperature is below the temperature range, the system controller 226 may activate a heating system 340 to bring the energy storage system to a predetermined temperature. If the sensor signal indicates the temperature is above the temperature range, the system controller 226 may activate a cooling system 342 to bring the energy storage system 320 to a predetermined temperature.

In some examples, the cooling system 342 is a liquid cooling system that circulates a non-conductive liquid to cool the battery cells. Based on the sensor signal, the system controller 226 may activate the cooling system 342 to bring the temperature of the energy storage system 320 to a predetermined temperature.

In some examples, the sensing circuit element 330 is a fluid level sensing element that produces a sensor signal representative of fluid level of the cooling system. The wakeup circuit 334 generates the activation signal when the fluid sensing circuit element indicates the fluid level is below a specified fluid level. In response to the activation signal, the system controller 226 may determine the fluid level status using the sensor signal. The system controller 226 may initiate adding more nonconductive liquid coolant to the one or more battery cells when the fluid level is below the specified fluid level range (e.g., by activating a remote control valve), or the system controller 226 may generate an alert that indicates a technician should service the energy storage system 320.

In some examples, the system controller 226 stores information associated with the environmental parameter being outside of the specified operating range in response to the controller activation signal. The information may include an identifier of the parameter, the value of the parameter, and one or both of the date and time of the excursion. In certain examples, the information includes the effect on the State of Health (SOH) of one or more battery cells of the energy storage system. The health and longevity of the battery cells are affected by exposure to extremes (e.g., extreme temperatures) and has a likelihood to affect the Warranty Coverage of the battery cells.

Figure 4A:
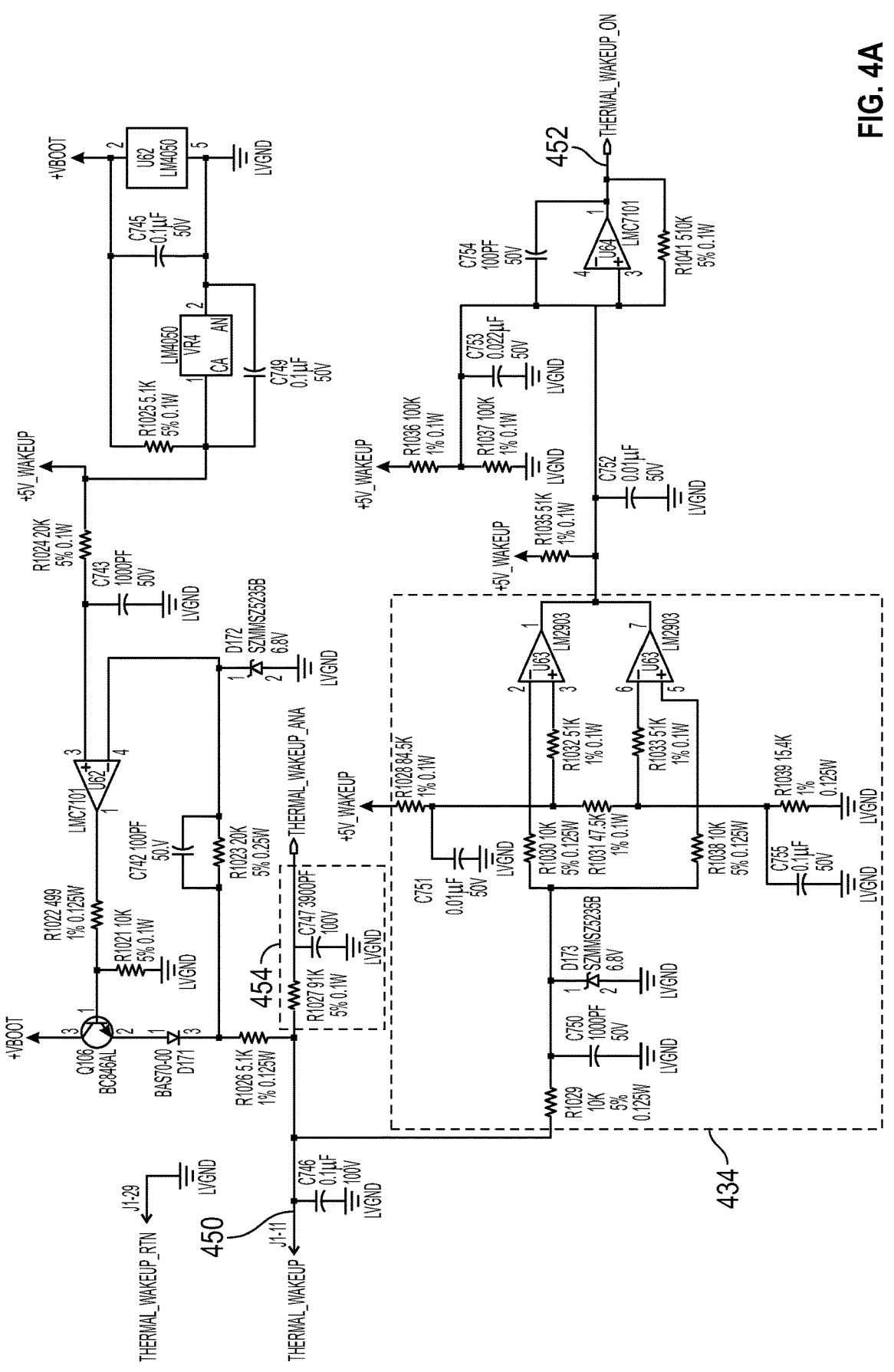
FIGS. 4A-4B show detailed circuit schematics in accordance with this disclosure.
Figure 4B:
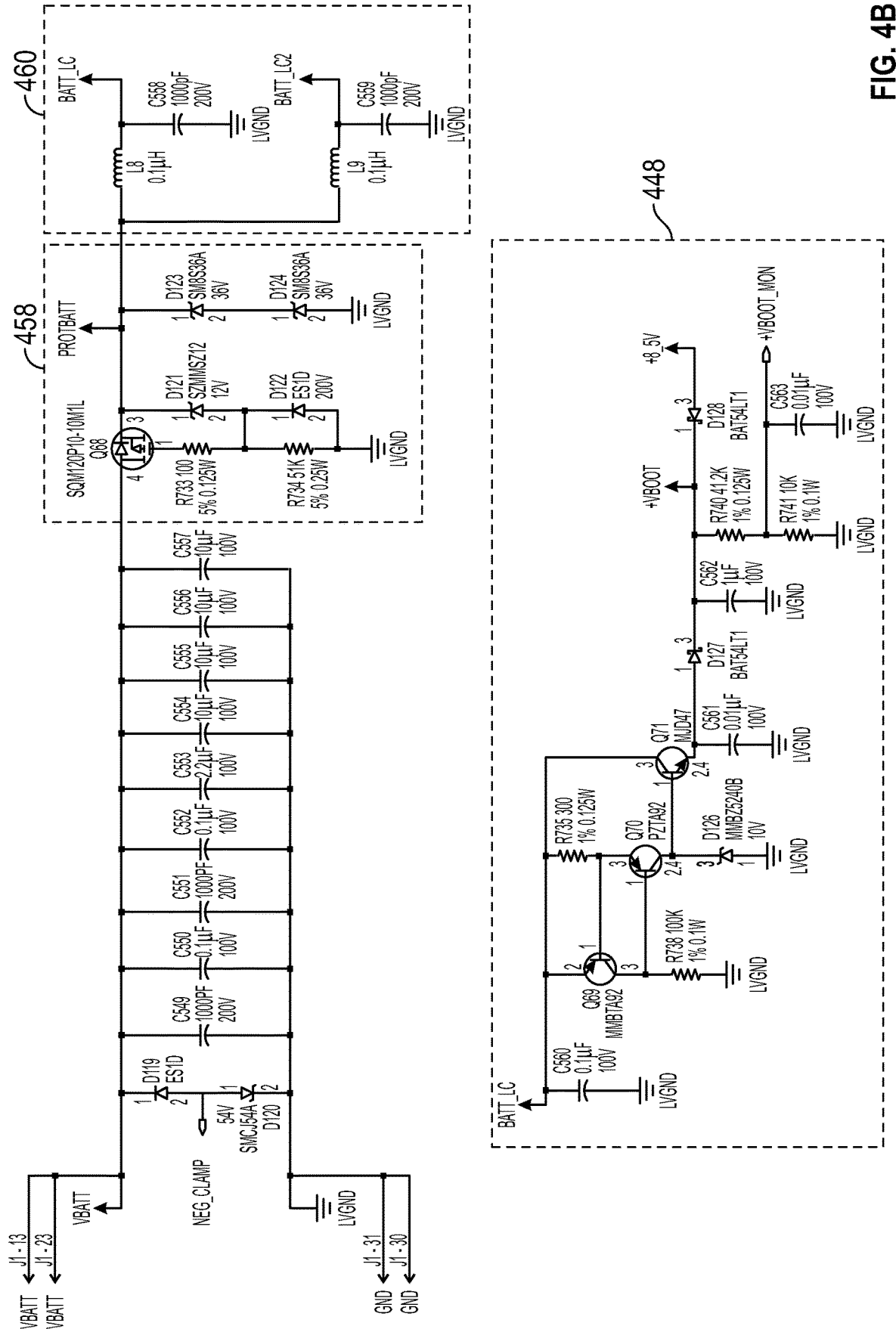

FIGS. 4A-4B show detailed circuit schematics of circuits that can be included in the interface 332 of the system controller 226. FIG. 4A includes an example of a wakeup circuit 434. The wakeup circuit 434 receives the sensor signal on an input 450, and the wakeup circuit 434 includes a window comparator circuit to determine of the sensor signal is within the specified signal range. The signal range is specified by voltages applied to one input of the comparators with the other input of the comparators electrically connected to the wakeup circuit input 450. The output of the window comparator circuit is used to generate the activation signal output 452 that goes to other portions of the system controller 226.

As part of its activation, the processing unit 328 of the system controller 226 may check the output of the sensing circuit element 330 to determine an environmental status of the energy storage system 320. The interface 332 can include a filter circuit 454 that filters the sensor signal that is used by the processing unit 328 to determine status of the energy storage system 320 and determine a corrective action. In certain examples, the filter circuit 454 is a single-pole low-pass filter circuit.

FIG. 4B includes an example of a bootstrap supply circuit 448 that supplies power to one or more circuits of the interface 332 that are active in the low power mode. FIG. 4B also includes a reverse battery protection circuit 458 and an inductor-capacitor LC filter circuit 460 connected between the reverse battery protection circuit and the bootstrap supply circuit.

The systems, devices and methods described herein provide a technique for monitoring the environmental conditions of the energy storage system to ensure proper performance and life cycle of the components of the energy storage system. The monitoring is achieved with the system controller in a lower power state or off state to minimize energy drain when the energy storage system is not in use.

INDUSTRIAL APPLICABILITY

FIG. 5 is a flow diagram of an example method of real time monitoring of the environment conditions of a battery system of a work machine. At block 505, a system controller of the battery system is operated in a low power mode when the battery system is powered down or otherwise disabled and not operated. Most of the circuitry of the system controller is powered down in the low power mode.

At block 510, an environmental parameter of the battery system is monitored using the system controller in the low power mode. An example of the environmental parameter is temperature. At block 515, while in the low power mode the system controller detects when the environmental parameter is outside of a specified operating range.

At block 520, the system controller is enabled and operated in an active mode in response to the detecting that the environmental parameter is outside of the specified operating range while the battery system is powered down. At block 525, the activated system controller performs a corrective action to bring the environmental parameter to within the specified operating range.

The above detailed description is intended to be illustrative, and not restrictive. The scope of the disclosure should, therefore, be determined with references to the appended claims, along with the full scope of equivalents to which such claims are entitled.

What is claimed is:

1. A monitoring circuit for a battery system of a work machine, the monitoring circuit comprising:
   a system controller configured to operate in a low power mode when the battery system is inactive;
   a sensing circuit element configured to produce an electrical sensor signal representative of an external environmental parameter of the battery system;
   a wakeup circuit configured to generate, when the battery system is in the low power mode, a controller activation signal to change the system controller from the low power mode to an active mode in response to the sensor signal indicating that the external environmental parameter is outside of a specified operating range; and
   wherein the system controller is configured to initiate a controller boot operation when transitioning from the low power mode to the active mode in response to the controller activation signal generated in response to the sensor signal.

2. The monitoring circuit of claim 1 including:
   a bootstrap supply circuit to power an interface of the system controller to the sensing circuit element in the low power mode, wherein the bootstrap supply circuit provides power to circuits that are active in the low power mode; and
   a main supply circuit for the system controller that is activated in response to the controller activation signal.

3. The monitoring circuit of claim 1, wherein the sensing circuit element includes a temperature sensing circuit element, and the wakeup circuit includes a window comparator circuit, and the window comparator circuit is configured to generate the activation signal when the sensing circuit element indicates a temperature that is outside of a specified temperature range.

4. The monitoring circuit of claim 3, wherein the system controller is configured to initiate activation of a heating system for the one or more battery cells when the sensing circuit element indicates a temperature that is below a specified temperature range.

5. The monitoring circuit of claim 3, wherein the system controller is configured to initiate activation of a cooling system for the one or more battery cells when the sensing circuit element indicates a temperature that is greater than the specified temperature range.

6. The monitoring circuit of claim 1, wherein the sensing circuit element includes a fluid level sensing circuit element configured to generate an indication of fluid level of a nonconductive liquid coolant of one or more battery cells of the battery system, and the wakeup circuit includes a comparator circuit configured to generate the activation signal when the fluid sensing circuit element indicates a fluid level below a specified fluid level.

7. The monitoring circuit of claim 2, including:

a reverse battery protection circuit; and an inductor-capacitor (LC) filter circuit coupled between the reverse battery protection circuit and the bootstrap supply circuit.

8. The monitoring circuit of claim 1 including:

a low pass filter circuit coupled to the sensing circuit element to produce a filtered sensor signal; and wherein the system controller is configured to enter an active mode in response to the controller activation signal and determine a corrective action using the filtered sensor signal when in the active mode.

9. The monitoring circuit of claim 1, including memory; and wherein the system controller is configured to store in the memory information associated with the environmental parameter being outside of the specified operating range in response to the controller activation signal.

\* \* \* \* \*